United States Patent
Dumas et al.

(10) Patent No.: US 10,543,821 B2
(45) Date of Patent: Jan. 28, 2020

(54) LIQUID RESERVOIR FOR VEHICLE AND MOTOR VEHICLE SYSTEM COMPRISING SUCH A RESERVOIR

(71) Applicant: ILLINOIS TOOL WORKS INC., Glenview, IL (US)

(72) Inventors: Pascal Dumas, Cluny (FR); Serge Iafrate, Montmerle sur Saone (FR)

(73) Assignee: Illinois Tool Works Inc., Glenview, IL (US)

( * ) Notice: Subject to any disclaimer, the term of this patent is extended or adjusted under 35 U.S.C. 154(b) by 555 days.

(21) Appl. No.: 14/766,464

(22) PCT Filed: Feb. 7, 2014

(86) PCT No.: PCT/US2014/015213
§ 371 (c)(1),
(2) Date: Aug. 7, 2015

(87) PCT Pub. No.: WO2014/124202
PCT Pub. Date: Aug. 14, 2014

(65) Prior Publication Data
US 2015/0360661 A1    Dec. 17, 2015

(30) Foreign Application Priority Data
Feb. 8, 2013 (FR) ..................... 13 51100

(51) Int. Cl.
*B60T 11/26* (2006.01)
*B60S 1/50* (2006.01)
(Continued)

(52) U.S. Cl.
CPC ................. *B60T 11/26* (2013.01); *B60S 1/50* (2013.01); *B60T 11/22* (2013.01); *B65D 25/02* (2013.01)

(58) Field of Classification Search
CPC . B60T 11/26; B60T 11/22; B60S 1/50; B65D 25/02
See application file for complete search history.

(56) References Cited

U.S. PATENT DOCUMENTS 4,385,495 A * 5/1983 Kubota ................. B60T 17/225
60/535
4,514,980 A * 5/1985 Ishiwata ................. B60T 11/26
60/534
(Continued)

FOREIGN PATENT DOCUMENTS

DE   19501210 A1   7/1996
EP   1615006 A1    1/2006
(Continued)

OTHER PUBLICATIONS

ISR for PCT/US2014/015213 dated Jul. 17, 2014.
Written Opinion for PCT/US2014/015213 dated Jul. 17, 2014.

*Primary Examiner* — Steven A. Reynolds
*Assistant Examiner* — Javier A Pagan
(74) *Attorney, Agent, or Firm* — Quarles & Brady LLP

(57) ABSTRACT

The present invention relates to a liquid reservoir for a vehicle that is subjected in service to inclinations in at least two different directions, the reservoir comprising a float well which delimits a bowl containing a float that is able to move depending on the level of liquid in the reservoir. The reservoir is characterized in that the float well comprises at least two retention means positioned successively along a flow path of the liquid as far as the bowl, from the outside toward the inside of the float well, each retention means keeping liquid in the float well if the reservoir is inclined in a set of directions specific to this retention means. The invention also relates to a motor vehicle system comprising (Continued)

such a liquid reservoir and means for binary detection of the level of liquid in the reservoir.

21 Claims, 4 Drawing Sheets

(51) Int. Cl.
  *B60T 11/22* (2006.01)
  *B65D 25/02* (2006.01)

(56) References Cited

U.S. PATENT DOCUMENTS

| | | | | |
|---|---|---|---|---|
| 4,775,856 | A | * 10/1988 | Ochs | B60T 11/26 200/84 R |
| 5,957,545 | A | * 9/1999 | Sawada | B60T 11/26 303/1 |
| 6,105,611 | A | * 8/2000 | Ando | B60T 11/26 137/558 |
| 6,984,000 | B2 | * 1/2006 | Fraisse | B60T 8/4081 188/345 |
| 2011/0083504 | A1 | 4/2011 | Unger | |
| 2011/0089120 | A1 | 4/2011 | Weigle et al. | |
| 2012/0292982 | A1 | * 11/2012 | Takahashi | B60T 11/22 303/6.01 |
| 2013/0036814 | A1 | * 2/2013 | Neumann | B60T 17/225 73/290 R |

FOREIGN PATENT DOCUMENTS

| | | |
|---|---|---|
| FR | 2970327 A1 | 7/2012 |
| JP | 2008014866 A | 1/2008 |

* cited by examiner

LIQUID RESERVOIR FOR VEHICLE AND MOTOR VEHICLE SYSTEM COMPRISING SUCH A RESERVOIR

RELATED APPLICATIONS

The present application is a National Phase of International Application Number PCT/US2014/015213 filed Feb. 7, 2014, and claims priority to French Application Number 1351100 filed Feb. 8, 2013.

The present invention relates to a liquid reservoir for a vehicle, in particular a motor vehicle. The invention also relates to a motor vehicle system comprising such a reservoir and means for binary detection of the level of liquid in this reservoir. The field of the invention is that of reservoirs provided with devices for detecting the level of liquid.

In practice, the operation of a motor vehicle requires particular fluids such as the coolant, the brake fluid, the engine oil, the power steering oil and the fuel, each being stored in a specific reservoir. The driver of the vehicle has to be informed of the level of certain fluids in the reservoir, for example for safety reasons for the brake fluid or for the purpose of usefulness for the fuel. The inclinations of the vehicle, in dependence on critical driving conditions (acceleration, braking, bends, slopes, etc.) or at a standstill, cause movements of each liquid in the corresponding reservoir.

Existing motor vehicle systems are equipped with various technologies for detecting the level of liquid. In particular, it is known to provide the reservoir with a float, the position of which varies in dependence on the level of liquid in this reservoir, as described for example in DE-A-195 01 210.

The reservoir having a float may be associated with a device for binary detection, which indicates if a minimum level of liquid has or has not been reached, such as for braking or cooling systems, or with a device for continuous detection, such as for the fuel or engine oil.

In the case of binary detection with a float, this detection should be effective regardless of the inclination of the vehicle, not just when the wheels of the vehicle at a standstill are resting on a horizontal flat surface. The position of the float in the reservoir is not always optimal, for example this position may be off-center, given the space requirements imposed by the constructor. When the level of liquid is low, but above the predetermined minimum level for binary detection, some inclinations may cause false detection and an untimely warning to be sent to the driver.

In order to remedy this, it is known to dispose the float in a well provided with an opening. The well conserves a quantity of liquid necessary for keeping the float in position. The opening allows liquid to flow into the well during an inclination of the vehicle in the direction corresponding to this opening. The height of the opening depends in particular on the predetermined minimum level and on the precision of the detection device associated with the float. This solution is satisfactory when a single inclination direction is the cause of untimely detections.

The aim of the invention is to propose a reservoir having an improved float well.

To this end, the subject of the invention is a liquid reservoir for a vehicle that is subjected in service to inclinations in at least two different directions, the reservoir comprising a float well which delimits a bowl containing a float that is able to move depending on the level of liquid in the reservoir. This reservoir is characterized in that the float well comprises at least two retention means positioned successively along a flow path of the liquid as far as the bowl, from the outside toward the inside of the float well, each retention means keeping liquid in the float well if the reservoir is inclined in a set of directions specific to this retention means.

Thus, the invention allows satisfactory detection of the level of liquid in the reservoir, regardless of the inclination of the vehicle and of the reservoir. In particular, when the reservoir is provided with means for binary detection of the level of liquid, untimely detections can be avoided. The level of liquid in the bowl of the float well depends on the level of liquid in the reservoir. When the level of liquid in the reservoir is greater than a predetermined upper reference level, in other words when the volume of liquid in the reservoir is greater than a predetermined upper reference volume, the arrangement of the flow path and of the retention means is such that the bowl is always filled with a sufficient quantity of liquid, regardless of the inclination of the reservoir. When the level of liquid in the reservoir is below a predetermined lower reference level, in other words when the volume of liquid in the reservoir is less than a predetermined lower reference volume, the bowl no longer receives liquid and the position of the float in the bowl makes it possible to detect this situation. A tolerance relative to the detection exists when the volume of liquid in the reservoir is between the upper and lower reference volumes. The invention makes it possible to reduce the range of uncertainty corresponding to this difference in volumes between reference volumes. Advantageously, the invention can be implemented with any type of liquid, reservoir or vehicle.

According to further advantageous features of the invention, taken individually or in combination:

- Each retention means keeps liquid in the float well if the reservoir is inclined in a set of directions corresponding to a sector defined about a central axis of the float well.
- The retention means have increasing heights, with respect to a lower wall of the reservoir, along the flow path as far as the bowl.
- The flow path is generally concentric with a central axis of the float well.
- The float well comprises a single retention means that forms the inlet to the flow path in the float well, and a single retention means that forms the outlet from the flow path toward the bowl.
- At least some retention means are generally located on one and the same circle that is concentric with a central axis of the float well.
- The float well comprises walls that delimit the flow path, of which an inner wall delimits the bowl accommodating the float, the flow path passing around this inner wall as far as the bowl.
- The float well comprises four retention means distributed at 90 degrees about a central axis of the float well.

Another subject of the invention is a motor vehicle system, characterized in that it comprises a liquid reservoir as mentioned above and means for binary detection of the level of liquid in the reservoir.

According to a particular embodiment, the reservoir contains liquid flowing in a preferred flow, and the first retention means from the outside toward the inside of the float well along the flow path is positioned outside the preferred flow of liquid in the reservoir. Thus, the flow of liquid in the reservoir is calmed and does not disrupt the position of the float in the well. This makes it possible to maintain optimal precision of detection. A reservoir in which the liquid flows in a preferred flow is for example a degassing reservoir with which a coolant system of the engine is equipped.

The invention will be understood better from reading the following description, which is given solely by way of nonlimiting example and with reference to the appended drawings, in which:

FIGS. 1 to 6 show a reservoir 10 in accordance with the invention, which contains a liquid L and is suitable for equipping a motor vehicle.

Figure 1:
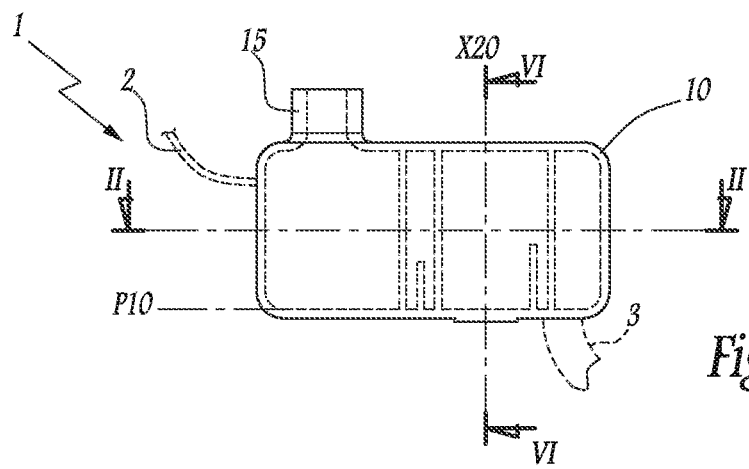
FIG. 1 is a side view of a liquid reservoir in accordance with the invention, the inside of the reservoir being shown by way of dotted lines.

More specifically, the reservoir 10 is suitable for equipping a motor vehicle system 1, also in accordance with the invention, which is shown partially in FIG. 1 for the sake of simplification. For example, the reservoir 10 maybe a brake liquid reservoir with which a motor vehicle braking system is equipped, or a degassing reservoir with which a cooling system for the engine is equipped. The system 1 comprises pipes or hoses, such as the pipes 2 and 3 shown partially and schematically by way of dotted lines in FIG. 1.

In the context of the invention, the system 1 also comprises means for binary detection of the level of liquid L in the reservoir 10, these means not being shown for the sake of simplification.

To this end, the reservoir 10 comprises a float well 20 containing a float 60 which is able to move in dependence on the level of liquid in the float well 20, and thus in dependence on the volume of liquid L in the reservoir 10, as explained in detail below. The detection of the volume of liquid L in the reservoir 10 depends on the position of the float 60 in a bowl 22 defined in the float well 20.

The reservoir 10 comprises a shell delimiting an internal volume V10. In the example in the figures, the shell of the reservoir 10 is formed by four side walls 11 and 12, a lower wall 13 and an upper wall 14, all of which are approximately planar. The side walls 11 and 12 are opposite one another in pairs and parallel. The walls 11 have a first length, while the walls 12 have a second length which is greater than the first length. The mutually parallel walls 12 may be known as longitudinal walls, while the mutually parallel walls 11 may be known as transverse walls. The walls 11 are perpendicular to the walls 12. The walls 13 and 14 are likewise mutually parallel and perpendicular to the side walls 11 and 12. In other words, the reservoir 10 has a generally perpendicular horizontal section and a generally parallelepipedal shape.

Alternatively, the reservoir 10 may have any shape suitable for the present application, for example a generally spherical, ovoid, cubic or any polyhedral shape.

The upper wall 14 has a neck 15 provided for filling the reservoir 10 and the circuit of the system 1. One of the side walls 12, for example the wall 12 closest to the neck 15, has at least one inlet orifice (not shown for the sake of simplification), which is provided to connect the pipe 2 to the reservoir 10. The lower wall 13 has at least one outlet orifice (not shown for the sake of simplification), which is provided to connect the pipe 3 to the reservoir 10.

Figure 5:
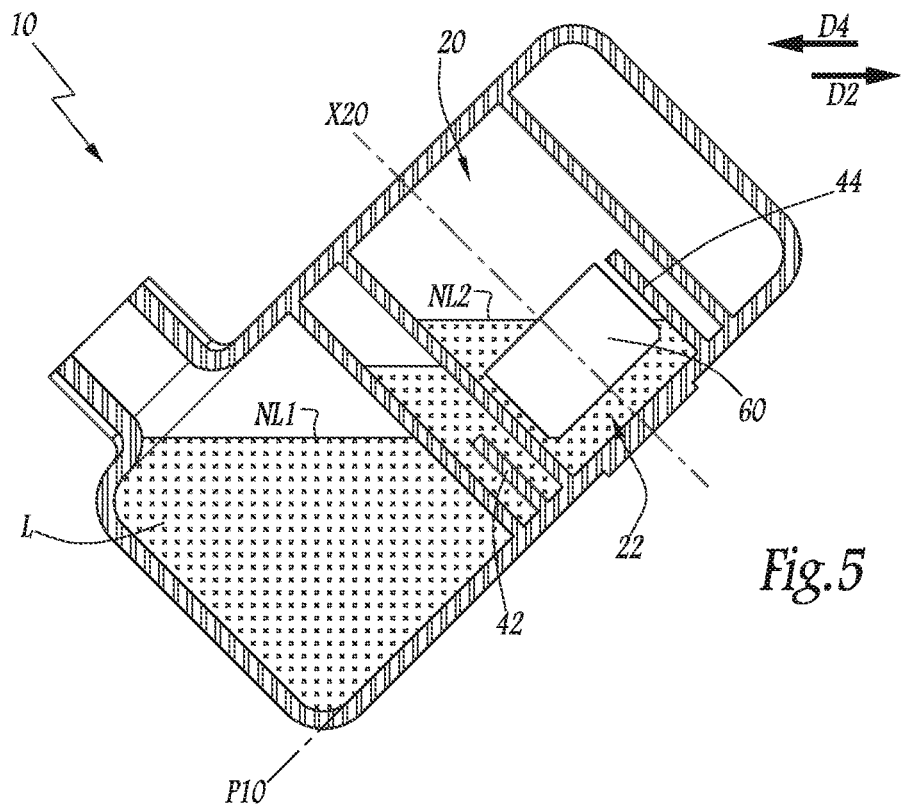
FIG. 5 is a section similar to FIG. 3, showing the reservoir inclined in a longitudinal direction.
Figure 6:
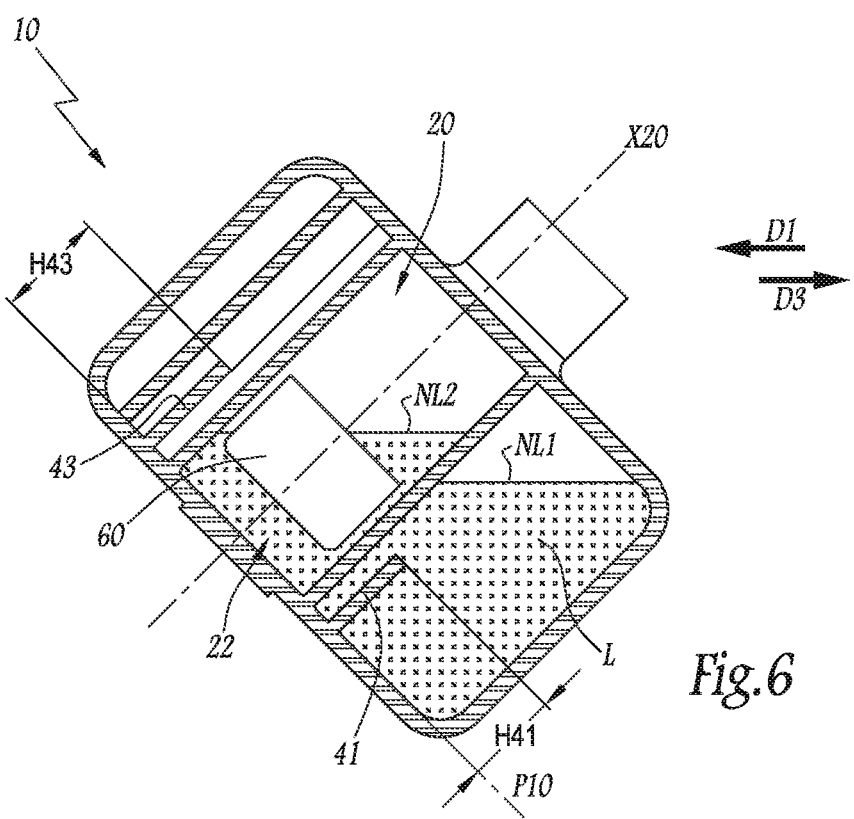
FIG. 6 is a section on the line VI-VI in FIG. 1, showing the reservoir inclined in a transverse direction.

The lower wall 13 delimits a reference plane P10, which is horizontal when the wheels of the vehicle at rest are resting on a horizontal flat surface. This plane P10 thus corresponds to the lowest level of the reservoir 10 and of the liquid L in the volume V10 when the reservoir 10 is not inclined. In practice, such a reference plane P10 is defined regardless of the shape of the reservoir 10 and the lower wall 13. When the vehicle and thus the reservoir 10 are inclined, the reference plane P10 is also inclined, as shown in FIGS. 5 and 6. The actual position of the float 60 in the bowl 22 is not shown in these FIGS. 5 and 6 for the sake of simplification.

Figure 3:
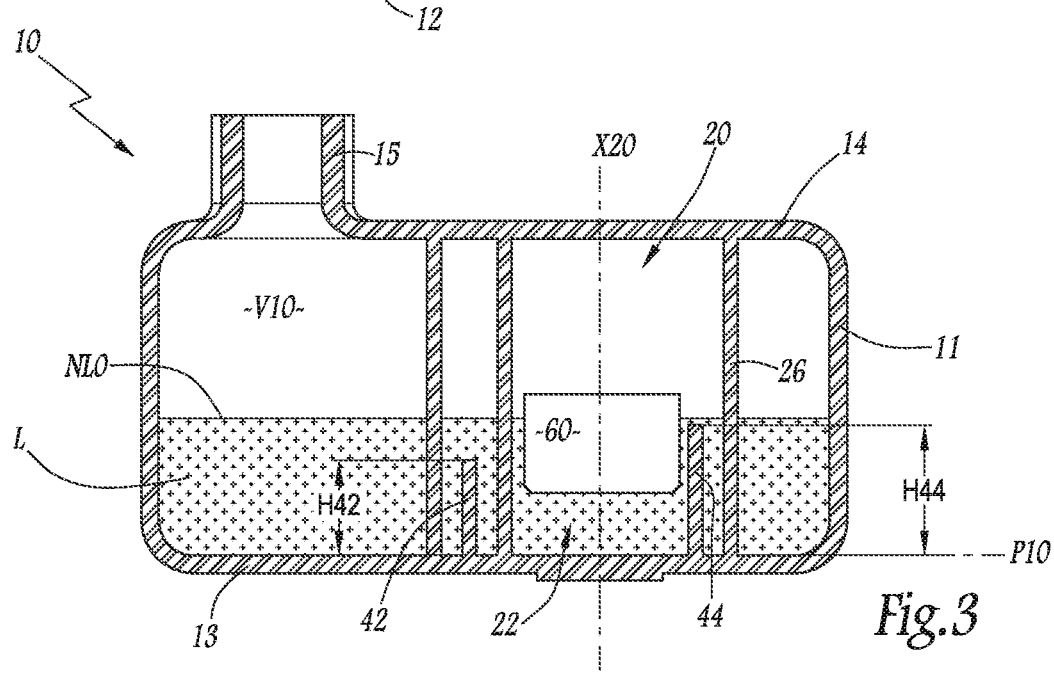
FIG. 3 is a section through the reservoir on the line III-Ill in FIG. 2.

Regardless of the inclination of the reservoir 10, the liquid L in the volume V10 is at a substantially horizontal level, without taking the possible oscillations due to the dynamic behavior of this liquid L into account. The behavior of the liquid L in the volume V10 also depends on the geometry of the reservoir 10 and on the flow rate within the system 1. When the reservoir 10 is at rest, the liquid L is at a level NL0 parallel to the plane P10. In the example in FIG. 3, this level NL0 is identical both in the bowl 22 and outside the well 20. In the case of an insufficient level of liquid in the reservoir 10, corresponding to detection and the sending of a warning, this level NL0 may be different in the bowl 22 and outside the well 20. When the reservoir 10 is inclined, the liquid L is at a level NL2 in the bowl 22 and NL1 outside the well 20, as shown in FIGS. 5 and 6. By virtue of the invention, the bowl 22 is not emptied if the reservoir 10 is inclined and the level NL2 remains above the level NL1. By contrast, the inclination of the reservoir 10 in some directions may cause liquid L to flow as far as the bowl 22.

Figure 2:
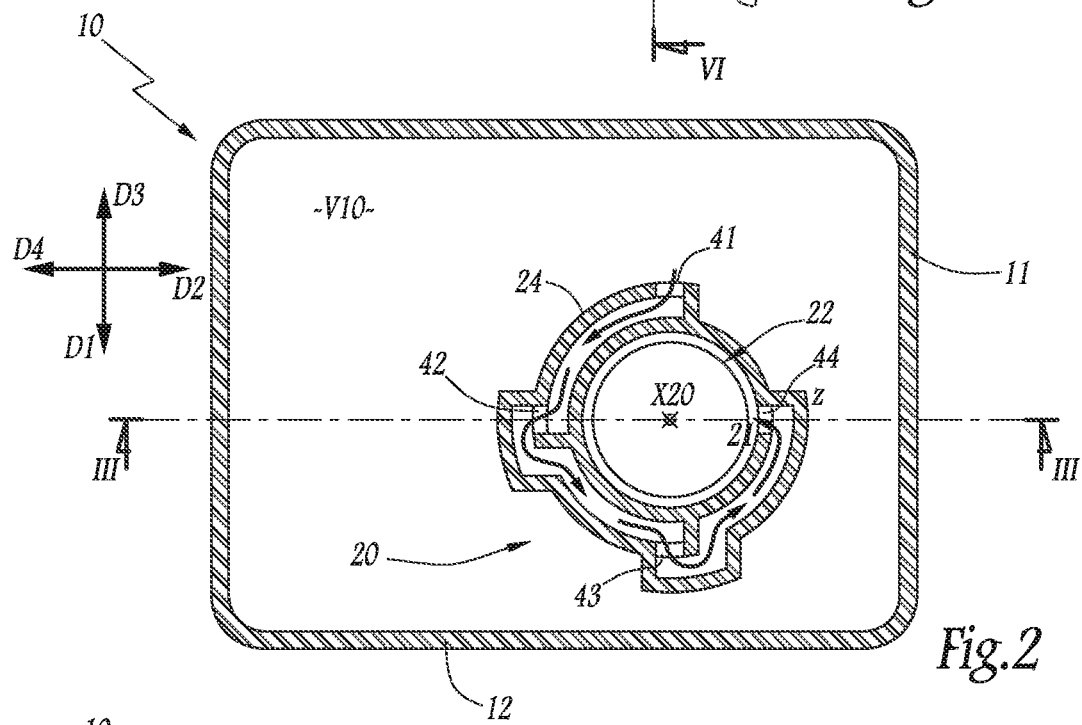
FIG. 2 is a section through the reservoir on the line II-II in FIG. 1, showing a float well with which the reservoir is equipped.
Figure 4:
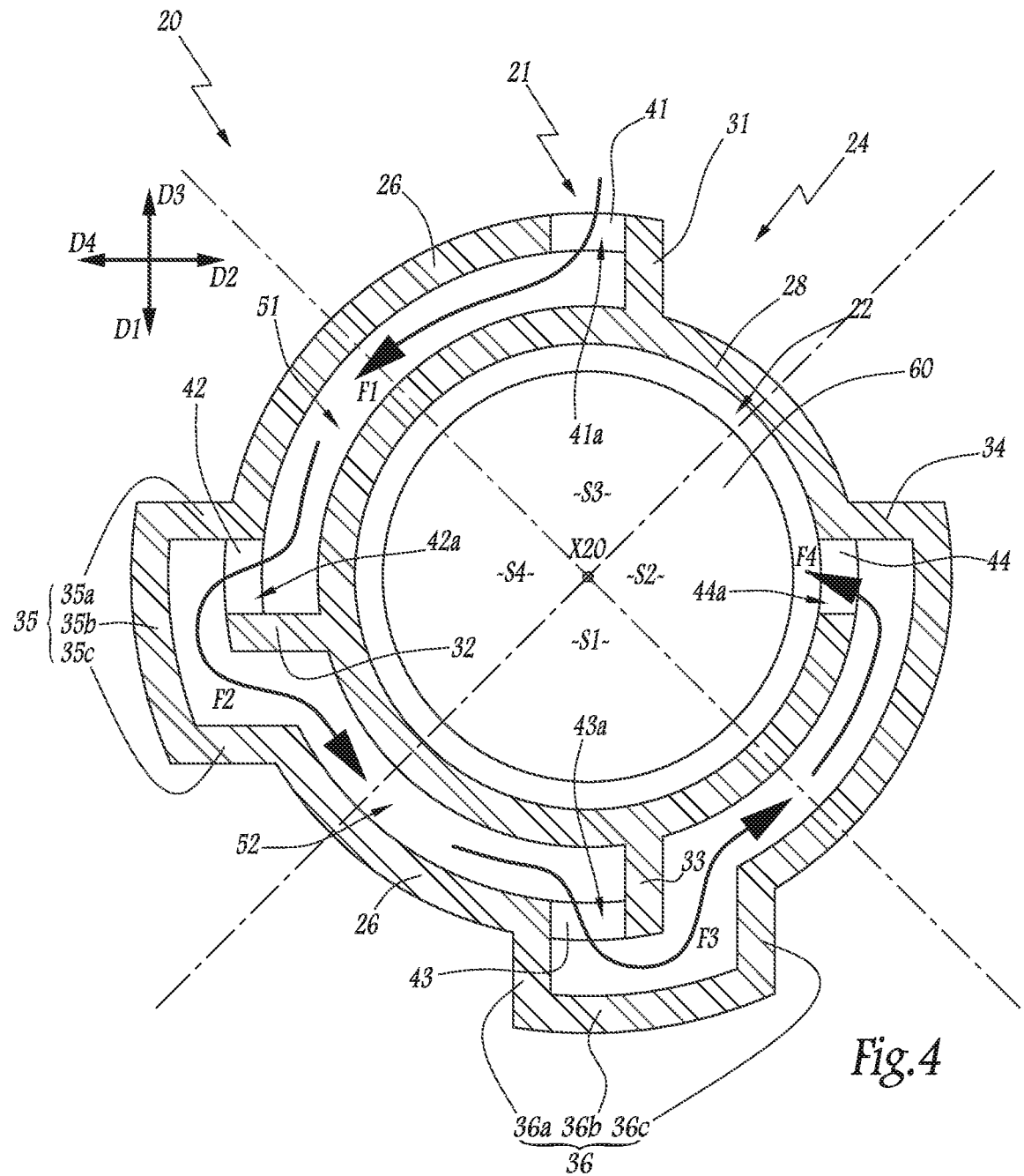
FIG. 4 is a view on a larger scale of the float well from FIG. 2.

As shown in particular in FIGS. 2 and 4, the float well 20 includes a flow path 21 of the liquid L as far as the bowl 22 containing the float 60, and also walls 24 delimiting the path 21 and the bowl 22. The path 21 guides the flow of liquid L from the outside toward the inside of the well 20, as far as the bowl 22. The bowl 22 has a generally cylindrical shape, centered on a central axis X20 of the well 20. The axis X20 is perpendicular to the plane P10. In other words, the axis X20 is vertical when the plane P10 is horizontal, regardless of the shape of the reservoir 10 and of the lower wall 13. The path 21 defines a direction of flow about the axis X20. The walls 24 extend between the lower wall 13 and the upper wall 14 of the reservoir 10, about the axis X20. The walls 24 of the well 20 include a cylindrical outer wall 26 and a cylindrical inner wall 28 which are centered on the axis X20, straight parts 31, 32, 33, 34, 35a, 35c, 36a, 36c perpendicular to the plane P10, and curved parts 35b and 36b that are concentric with the axis X20. The parts 35a, 35b and 35c form a protrusion 35 which extends beyond the wall 26 away from the axis X20. Similarly, the parts 36a, 36b and 36c form a protrusion 36 which extends beyond the wall 26 away from the axis X20.

In the context of the invention, the float well 20 comprises retention means 41, 42, 43 and 44 which are positioned successively along the flow path 21 of the liquid L from the outside toward the inside of the well 20, as far as the bowl 22. The retention means 41-44 make it possible, firstly, to retain a certain quantity of liquid L in the well 20 regardless of the inclination of the reservoir 10 and, secondly, to discharge this liquid L into the bowl 22 if the reservoir 10 is inclined. When the volume of liquid L in the reservoir 10 is greater than a predetermined upper reference volume, the arrangement of the flow path 21 and of the retention means 41-44 is such that the bowl 22 is always filled with a sufficient quantity of liquid L, regardless of the inclination of the reservoir 10. When the volume of liquid L in the reservoir 10 is less than a predetermined lower reference volume, the position of the float 60 in the bowl 22 makes it possible to detect this situation and to send a warning. By virtue of the arrangement of the flow path 21 and of the retention means 41-44, the volume tolerance range between the upper and lower reference volumes is reduced.

The retention means 41-44 are formed on the lower wall 13 of the reservoir 10. A slot, respectively 41a, 42a, 43a and 44a, formed in one of the walls 24 of the well 20, on the lower wall 13 of the reservoir 10, corresponds to each retention means 41, 42, 43 and 44. Each retention means 41, 42, 43 and 44 has a height, respectively H41, H42, H43 and H44, which depends on the dimensions of the corresponding slot 41a, 42a, 43a and 44a. The heights H41, H42, H43 and H44 are defined in a direction perpendicular to the lower wall 13 and to the plane P10. The heights H41, H42, H43 and H44 are set in dependence on the upper and lower reference volumes. In a preferred but non-obligatory manner, the heights H41, H42, H43 and H44 increase along the flow path 21 so as to facilitate the flow of liquid L as far as the bowl 22.

Along the path 21, the retention means 41, 42, 43 and 44 allow a flow of liquid, respectively F1, F2, F3 and F4, to flow in the direction of the bowl 22, or in the opposite direction. The retention means 41 and the slot 41a form the only inlet passage for liquid L into the well 20, through the walls 24, more specifically through the wall 26. The retention means 44 and the slot 44a form the only inlet passage for liquid L into the bowl 22, through the walls 24, more specifically through the wall 28. In other words, the retention means 41 delimits the inlet to the path 21, while the retention means 44 delimits the outlet from the path 21. The retention means 42 is formed in the region of the protrusion 35, between the parts 32 and 35a of walls 24. The retention means 43 is formed in the region of the protrusion 36, between the parts 33 and 36a of walls 24. A cavity 51 for storing liquid L is formed between the retention means 41 and 42, the straight parts 31 and 32 and the walls 26 and 28. A cavity 52 for storing liquid L is formed between the retention means 42 and 43, the protrusion 35, the straight parts 32 and 33 and the walls 26 and 28. A cavity 53 for storing liquid L is formed between the retention means 43 and 44, the protrusion 36, the straight parts 33 and 34 and the walls and 26 and 28. In other words, the cavities 51, 52 and 53 are interposed between the retention means 41-44.

In the example in FIGS. 2 and 4, the retention means 41, 42, 43 and 44 are located on one and the same circle that is concentric with the axis X20, continuing the wall 26. In other words, the retention means 41-44 are generally formed in an orthoradial orientation with respect to the axis X20, this making it possible to properly control the discharge of liquid L over these retention means 41-44. The wall 26 extends around the axis X20 except for, firstly, in the region of the protrusions 35 and 36 and, secondly, between the parts 31 and 34. The wall 26 thus has a generally cylindrical shape, but without forming a complete cylinder around the axis X20. The wall 28 extends around the axis X20, on a circle that is concentric with this axis X20 and has a smaller radius than the circle associated with the wall 26. The wall 28 defines the bowl 22, which is closed except for in the region of the retention means 44 and the slot 44a. The wall 28 thus has a cylindrical shape, and is only open in the region of the slot 44a. Alternatively, the walls 24, more specifically the wall 26 and the wall 28, may have a different shape. In practice, these walls 26 and 28 have a shape which is adapted to the shape of the float 60.

In the embodiment in FIGS. 1 to 6, there are four retention means 41-44, each corresponding to a set of inclination directions including a critical inclination direction, in an orthogonal reference system. More specifically, as shown in FIGS. 2 and 4 to 6, four orthogonal directions D1, D2, D3 and D4 which are opposite one another in pairs are defined. The opposite directions D1 and D3 correspond to the transverse inclinations, while the opposite directions D2 and D4 correspond to the longitudinal inclinations. When the reservoir 10 is inclined in one of the directions D1 to D4, the axis X20 is inclined in this direction D1 to D4 above the approximately horizontal level NL2 of liquid L in the well 20. A particular critical detection condition, linked with the functioning of the vehicle, namely in the case of acceleration, braking or turning to the left or right, corresponds to each direction D1 to D4.

One of the critical inclination directions, respectively D1, D2, D3 and D4, is associated with each retention means 41, 42, 43 and 44. Furthermore, a sector S1, S2, S3 and S4 centered on the axis X20 is associated with each retention means 41, 42, 43 and 44, as shown in FIG. 4. Each sector 51, S2, S3 and S4 corresponds to a set of inclination directions, including respectively the directions D1, D2, D3 and D4. Each sector S1-S4 delimits an angle of 90 degrees about the axis X20. If the reservoir 10 is inclined in a direction defined by the sector 51, the retention means 41 is then located at the highest point of all the retention means 41-44. The same goes for the other sectors S2, S3, S4 and the associated retention means, respectively 42, 43 and 44.

The detailed operation of the well 20, if the reservoir 10 is inclined, is described in detail below.

When the reservoir 10 is inclined in the direction D1 or any direction defined by the sector S1, a part of the liquid L present outside the well 20 flows along the flow F1 over the retention means 41 into the cavity 51, then along the flow F2 over the retention means 42 into the cavity 52, then along the flow F3 over the retention means 43 into the cavity 53. A small quantity of liquid L present in the bowl 22 flows over the retention means 44 into the cavity 53, going back up the path 21. The inclination of the reservoir 10 in the direction D1 or a direction defined by the sector 51 tends to cause an accumulation of liquid L in the cavities 52 and 53 and in the region of the protrusion 36. When the volume of liquid L in the reservoir 10 is greater than the upper reference volume, the bowl 22 conserves a quantity of liquid L that is sufficient to avoid a false warning, whereas when the volume of liquid L in the reservoir 10 is less than the lower reference volume, the bowl 22 includes a quantity of liquid L that triggers a warning.

When the reservoir 10 is inclined in the direction D2 or any direction defined by the sector S2, a part of the liquid L present in the cavity 51 escapes over the retention means 41, going back up the path 21. A part of the liquid L present in the bowl 22 flows over the retention means 44 into the cavity 53, going back up the path 21. By contrast, a part of the liquid L present in the cavity 52 flows along the flow F3 over the retention means 43, as far as into the cavity 53. The inclination of the reservoir 10 in the direction D2 or a direction defined by the sector S2 tends to cause an accumulation of liquid L in the cavity 53 and the bowl 22. When the volume of liquid L in the reservoir 10 is greater than the upper reference volume, the bowl 22 contains a quantity of liquid L that is sufficient to avoid a false warning, whereas when the volume of liquid L in the reservoir 10 is less than the lower reference volume, the bowl 22 includes a quantity of liquid L that triggers a warning.

When the reservoir 10 is inclined in the direction D3 or any direction defined by the sector S3, a part of the liquid L present in the cavity 52 escapes over the retention means 42 into the cavity 51, then over the retention means 41 and out of the well 20, going back up the path 21. On the other hand, a part of the liquid L present in the cavity 53 flows along the flow F4 over the retention means 44, as far as into the bowl 22. The inclination of the reservoir 10 in the direction D3 or in a direction defined by the sector S3 tends to cause an accumulation of liquid L in the bowl 22. When the volume of liquid L in the reservoir 10 is greater than the upper reference volume, the bowl 22 contains a quantity of liquid L that is sufficient to avoid a false warning, whereas when the volume of liquid L in the reservoir 10 is less than the lower reference volume, the bowl 22 includes a quantity of liquid L that triggers a warning.

When the reservoir 10 is inclined in the direction D4 or any direction defined by the sector S4, a part of the liquid L present in the cavity 53 escapes over the retention means 43 as far as into the cavity 52, going back up the path 21. A part of the liquid L present in the cavity 51 escapes over the retention means 42 as far as into the cavity 52. On the other hand, the liquid L present in the bowl 22 cannot escape over the retention means 44. The inclination of the reservoir 10 in the direction D4 or a direction defined by the sector S4 tends, firstly, to cause an accumulation of liquid L in the cavities 51 and 52 and in the region of the protrusion 35 and, secondly, to cause liquid L to be kept in the bowl 22. When the volume of liquid L in the reservoir 10 is greater than the upper reference volume, the bowl 22 conserves a quantity of liquid L that is sufficient to avoid a false warning, whereas when the volume of liquid L in the reservoir 10 is less than the lower reference volume, the bowl 22 includes a quantity of liquid L that triggers a warning.

In practice, each retention means 41-44 keeps liquid L in the well 20 or discharges liquid L into the well 20, if the reservoir 10 is inclined in a set of directions specific to this retention means 41, 42, 43 or 44, for which this retention means 41, 42, 43 or 44 is located at the highest point of all the retention means 41-44. Each retention means 41-44 with which the well 20 of the reservoir 10 according to the invention is equipped corresponds to a set of inclination directions which would be liable to generate an untimely detection in the reservoirs of the prior art. Moreover, the heights H41, H42, H43 and H44 are provided in order that the different possible inclinations of the reservoir 10 do not cause the discharge into the bowl 22 or the escape from the bowl 22 of a quantity of liquid L that is liable to result in false detection depending on the position of the float 60. Thus, the invention makes it possible to avoid any untimely detection.

Furthermore, the motor vehicle system 1 and the reservoir 10 may be shaped differently than FIGS. 1 to 6 without departing from the scope of the invention. In particular, the shell of the reservoir 10, the float well 20 and the retention means 41-44 may have any arrangement or configuration suitable for the present application.

Regardless of the embodiment, the float well 20 comprises at least two retention means positioned successively along the flow path 21 of the liquid L as far as the bowl 22, from the outside toward the inside of the well 20, each retention means keeping liquid L in the float well 20 if the reservoir 10 is inclined in a set of distinct directions, specific to each retention means. For this set of inclination directions, the retention means becomes the highest point of all the retention means.

Preferably, the float well 20 comprises between two and four retention means arranged along the flow path 21. Alternatively, the well 20 may have more than four retention means.

In a variant which is not shown, the retention means 41-44 may be disposed successively along the path 21 in an orientation different than FIGS. 1 to 6. For example, the retention means 41-44 may be disposed in a generally radial orientation with respect to the axis X20.

According to another variant which is not shown, the flow path 21 may have any shape, as long as the arrangement of the retention means 41-44 on this path 21 makes it possible to keep liquid L in the well 20 or to discharge liquid L into the well 20.

According to another variant which is not shown, the walls 24 do not extend as far as the upper wall 14 of the reservoir 10.

According to another variant which is not shown, the reservoir 10 may have a general shape other than a parallelepipedal shape, for example a generally spherical shape, cubic shape or any shape.

According to another variant which is not shown, the reservoir 10 may have further inlet and outlet orifices for liquid, depending on the motor vehicle system 1 in which this reservoir 10 is integrated.

According to another variant which is not shown, the reservoir 10 may include barriers for guiding the flow of liquid L in the volume V10, in particular with respect to the well 20 and/or with respect to the inlet and outlet orifices for liquid L.

Figure 7:
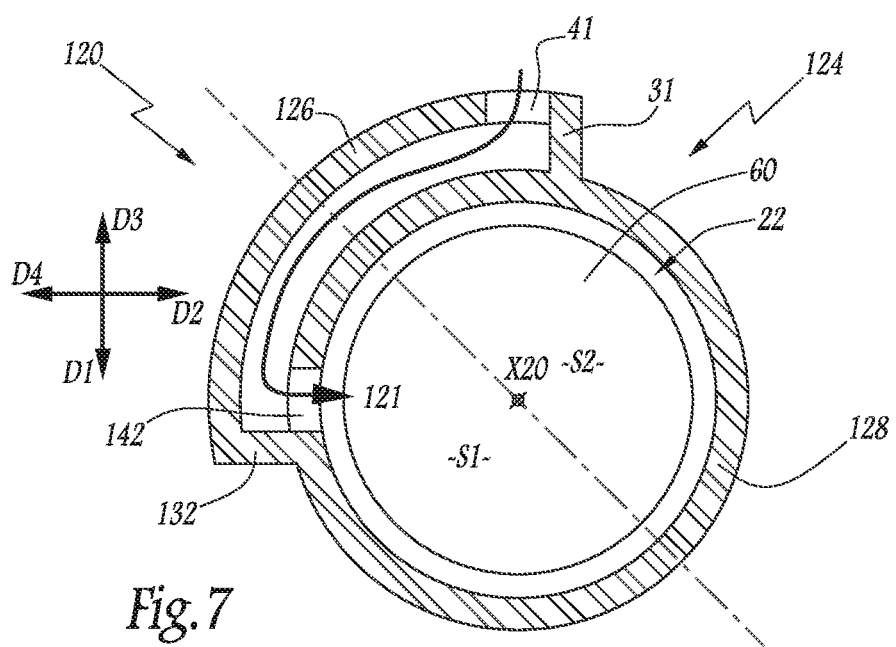
FIG. 7 is a view similar to FIG. 4, showing a first variant of a float well suitable for equipping the reservoir.
Figure 8:
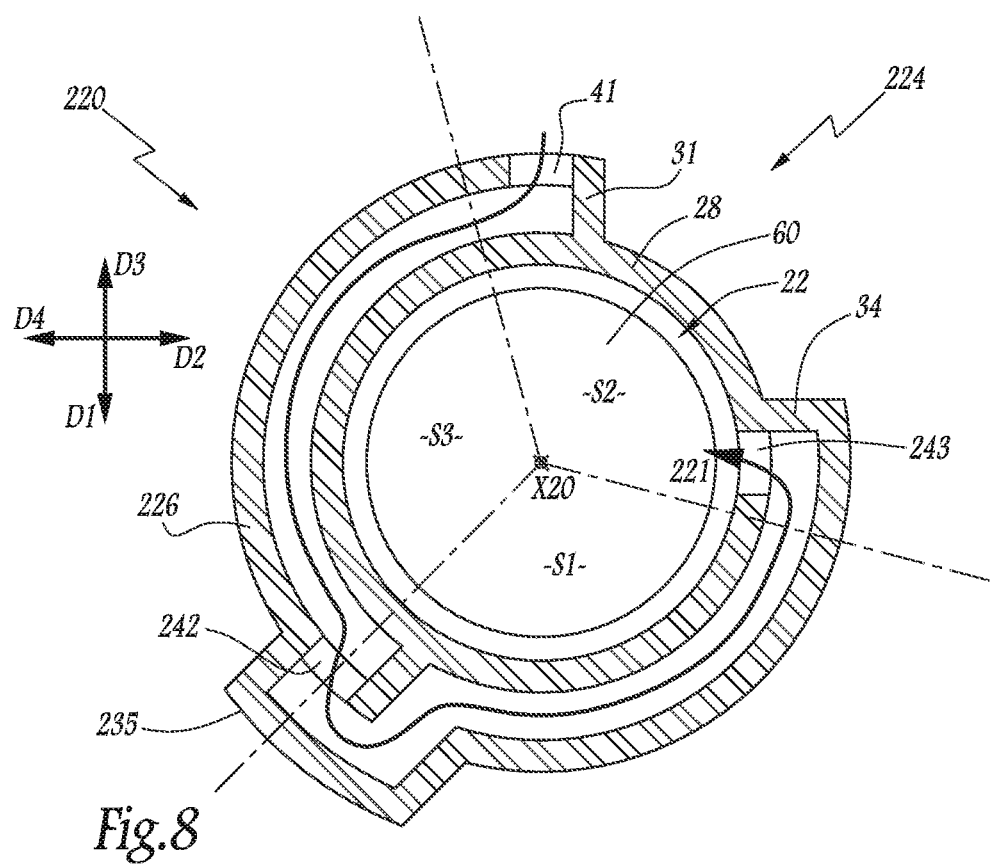
FIG. 8 is a view similar to FIGS. 4 and 7, showing a second variant of a float well suitable for equipping the reservoir.

FIGS. 7 and 8 show variants of float wells, respectively 120 and 220, suitable for equipping the reservoir 10 according to the invention.

Some constituent elements of the wells 120 and 220 are identical to those in the first embodiment, described above, and have the same reference numerals. Further constituent elements have a similar function, but a different structure or arrangement than the first embodiment described above, and have reference numerals increased by 100. Only the differences from the well 20 of the first embodiment are described in detail below.

As shown in FIG. 7, the well 120 comprises a flow path 121, walls 124, the retention means 41 and a retention means 142. The walls 124 comprise the wall 31, a wall 132, and walls 126 and 128. The retention means 142 is formed in the wall 128 and forms the outlet of the flow path 121 toward the bowl 22. The two retention means 41 and 142 follow one another along the path 121. The two retention means 41 and 142 are distributed angularly about the central axis X20 of the float well 120, being generally spaced apart by 90 degrees along the flow path 121. Each sector S1 and S2 delimits an angle of 180 degrees about the axis X20. The sector S1 includes the two critical detection directions D1 and D4, while the sector S2 includes the two critical detection directions D2 and D3.

As an alternative, the two retention means 41 and 142 may be spaced apart by an angle other than 90 degrees about the central axis X20. In this case, each sector S1 and S2 delimits a different angle about the axis X20.

Although less advantageous than the configuration of the well 20 in FIGS. 1 to 6, the particular configuration of the well 120 in FIG. 7 is simpler and makes it possible to achieve the aim of the invention.

As shown in FIG. 8, the well 220 comprises a flow path 221, walls 224, the retention means 41, a retention means 242 and a retention means 243. The walls 224 comprise the wall 28, the wall 31, the wall 34, a wall 226 and a protrusion 235. The three retention means 41, 242 and 243 follow one another along the path 221, with the retention means 242 being formed in the region of the protrusion 235, while the retention means 243 equivalent to the retention means 44 is formed in the wall 28 and forms the outlet of the flow path 221 toward the bowl 22. The three retention means 41, 242 and 243 are distributed angularly about the central axis X20 of the float well 220, being generally spaced apart by 135 degrees along the flow path 221. Each sector S1 and S3 delimits an angle of 112.5 degrees, while the sector S2 delimits an angle of 135 degrees, about the axis X20. The sector S1 includes the critical detection direction D1, the sector S2 includes the two critical detection directions D2 and D3, while the sector S3 includes the critical detection direction D4. The retention means 242 positioned in the region of the protrusion 235 thus corresponds to the two critical detection directions D2 and D3.

As an alternative, the retention means 41, 242 and 243 may be spaced apart along the flow path 221 at different angles, defined about the central axis X20.

In order that each retention means is predominant for a set of quite distinct inclination directions, the retention means may advantageously be distributed angularly about the central axis X20 of the float well 20, being spaced apart at angles greater than or equal to 90 degrees along the flow path.

Moreover, all or some of the technical features of the various embodiments may be combined with one another. Thus, the reservoir may be adapted in terms of structure, function, cost and performance.

The invention claimed is:

1. A reservoir for a vehicle, the reservoir comprising:
   one or more first sidewalls defining a cavity configured to accommodate a liquid;
   a float within the cavity;
   one or more second sidewalls within the cavity extending away from an inner surface of at least one of the one or more first sidewalls, the one or more second sidewalls defining a float well comprising:
      a bowl region defined by at least one of the one or more second sidewalls, the bowl region being configured to accommodate at least some of the liquid accommodated by the cavity, at least one of the one or more second sidewalls being configured to constrain the float within the bowl region of the float well such that the float is movable based on the level of liquid in the bowl region of the float well;
      a flow path coupling the bowl region with a portion of the cavity outside the bowl region, the flow path being a space between at least one of the one or more second sidewalls that is offset from the one or more second sidewalls defining the bowl region such that the liquid accommodated by the cavity is able to move into and out of the bowl region, the at least one of the one or more second sidewalls defining the flow path being directly connected to the one or more second sidewalls defining the bowl region or indirectly connected to the one or more second sidewalls defining the bowl region by another second sidewall of the one or more second sidewalls; and
      at least two retention walls positioned successively along the flow path between the portion of the cavity communicatively coupled with the bowl region and the bowl region,
   wherein
      the at least two retention walls are configured to allow the liquid to move into and out of the bowl region of the float well based on a level of liquid accommodated by at least one of the cavity, the flow path or the bowl region of the float well, and
      each retention wall is configured to keep liquid in the float well if the reservoir is moved from a reference position to an inclined position.

2. The reservoir as claimed in claim 1, wherein each retention wall is configured to keep liquid in the float well if the reservoir is inclined in a set of directions corresponding to a sector defined about a central axis of the float well.

3. The reservoir as claimed in claim 1, wherein the retention walls have different heights with respect to the inner surface along the flow path as far as the bowl.

4. The reservoir as claimed in claim 1, wherein the flow path is generally concentric with a central axis of the float well.

5. The reservoir as claimed in claim 4, wherein the at least two retention walls are positioned along the flow path such that each of the at least two retention walls is on a same circle that is concentric with the central axis of the float well.

6. The reservoir as claimed in claim 1, wherein the float well comprises a first retention wall at an inlet to the flow path, and a second retention means that forms the wall at an outlet from the flow path, the outlet from the flow path being closer to the bowl region than the inlet to the flow path.

7. The reservoir as claimed in claim 1, wherein the float well comprises four retention walls distributed at 90 degrees about a central axis of the float well.

8. A reservoir, comprising:
   one or more first sidewalls defining a cavity configured to accommodate a liquid;
   a float within the cavity;
   one or more second sidewalls within the cavity extending away from an inner surface of at least one of the one or more first sidewalls, the one or more second sidewalls defining a float well comprising:
      a bowl region defined by at least one of the one or more second sidewalls, the bowl region being configured to accommodate at least some of the liquid accommodated by the cavity, at least one of the one or more second sidewalls being configured to constrain the float within the bowl region of the float well such that the float is movable based on the level of liquid in the bowl region of the float well;
      a flow path coupling the bowl region with a portion of the cavity outside the bowl region, the flow path being a space between at least one of the one or more second sidewalls that is offset from one or more second sidewalls defining the bowl region such that the liquid accommodated by the cavity is able to move into and out of the bowl region, the at least one of the one or more second sidewalls defining the flow path being directly connected to the one or more second sidewalls defining the bowl region or indirectly connected to the one or more second sidewalls defining the bowl region by another second sidewall of the one or more second sidewalls,
   wherein
      one or more of the second sidewalls defining the flow path have a first slot at an inlet of the flow path such that the flow path is in fluidic communication with the portion of the cavity outside the bowl region, a first portion of the one or more second sidewalls aligned with the first slot has a first height with respect to the inner surface that is less than a height of the one or more second sidewalls with respect to the inner surface, and one or more of the second sidewalls defining the bowl region have a second slot at an outlet of the flow path such that the flow path is in fluidic communication with the bowl region, a second portion of the one or more second sidewalls aligned with the second slot has a second height with respect to the inner surface that is less than the height of the one or more second sidewalls defining the bowl region with respect to the inner surface.

9. The reservoir as claimed in claim 8, wherein the first height and the second height are different.

10. The reservoir as claimed in claim 8, wherein the one or more of the second sidewalls defining the flow path have a third slot and a fourth slot distributed at 90 degrees about a central axis of the float well.

11. The reservoir as claimed in claim 10, wherein portions of the one or more second sidewalls in alignment with the third slot and the fourth slot have heights increasing with respect to the inner surface as a distance from the input of the flow path increases toward the bowl region along the flow path.

12. The reservoir as claimed in claim 11, wherein at least one of the one or more second sidewalls defining the flow path is concentric with the central axis of the float well.

13. The reservoir as claimed in claim 12, wherein one or more of the first slot, the third slot, or the fourth slot is in one of the one or more second sidewalls that is concentric with the central axis of the float well.

14. The reservoir as claimed in claim 10, wherein
the one or more of the second sidewalls defining the flow path are arranged such that the flow path is substantially concentric with the central axis and the one or more of the second sidewalls are arranged such that the flow path has a first bump-out section outside the substantially concentric flow path and a second bump-out section outside the substantially concentric flow path,
the third slot is downstream of the first slot in a direction of the bowl region at an inlet of the first bump-out section, and
the fourth slot is downstream of the third slot in the direction of the bowl region at an inlet of the second bump-out section.

15. The reservoir as claimed in claim 10, wherein the float well is free from having one or more of the second sidewalls at an outlet of the first bump-out region and an outlet of the second bump-out region.

16. A reservoir, comprising:
one or more first sidewalls defining a cavity configured to accommodate a liquid;
a float within the cavity;
one or more second sidewalls within the cavity extending away from an inner surface of at least one of the one or more first sidewalls, the one or more second sidewalls defining a float well comprising:
a bowl region defined by at least one of the one or more second sidewalls, the bowl region being configured to accommodate at least some of the liquid accommodated by the cavity, at least one of the one or more second sidewalls being configured to constrain the float within the bowl region of the float well such that the float is movable based on the level of liquid in the bowl region of the float well;
a flow path coupling the bowl region with a portion of the cavity outside the bowl region, the flow path being a space between at least one of the one or more second sidewalls that is offset from one or more second sidewalls defining the bowl region such that the liquid accommodated by the cavity is able to move into and out of the bowl region, the flow path having at least two concentric portions that are concentric with a central axis of the float well and at least one bump-out portion outside the at least two concentric portions; and
at least two retention structures positioned successively along the flow path between the portion of the cavity communicatively coupled with the bowl region and the bowl region,
wherein
the at least two retention structures are configured to allow the liquid to move into and out of the bowl region of the float well based on a level of liquid accommodated by at least one of the cavity, the flow path or the bowl region of the float well, and
each retention structure is configured to keep liquid in the float well if the reservoir is moved from a reference position to an inclined position.

17. The reservoir as claimed in claim 16, wherein at least one of the at least two retention structures comprises a portion of the one or more second sidewalls.

18. The reservoir as claimed in claim 16, wherein the float well comprises a first retention structure at an inlet to the flow path, and a second retention structure at an outlet from the flow path, the outlet from the flow path being closer to the bowl region than the inlet to the flow path.

19. The reservoir as claimed in claim 18, further comprising a third retention structure between the first retention structure and the second retention structure.

20. The reservoir as claimed in claim 19, wherein at least one of the first retention structure, the second retention structure or the third retention structure has a height with respect to the inner surface that is different from at least one other of the first retention structure, the second retention structure or the third retention structure.

21. The reservoir as claimed in claim 19, wherein at least two of the first retention structure, the second retention structure and the third retention structure are distributed at 90 degrees from one another about the central axis of the float well.

* * * * *